(12) United States Patent
Messenger et al.

(10) Patent No.: US 10,836,318 B2
(45) Date of Patent: Nov. 17, 2020

(54) LOGO LAMP ASSEMBLY AND METHOD OF USING SAME

(71) Applicant: SMR Patents S.à.r.l., Luxembourg (LU)

(72) Inventors: Jacob Messenger, Richmond (AU); Daniel Flynn, Quantong (AU); Simon Belcher, South Plympton (AU); Jake Whittenbury, Glenside (AU); Dean Stevens, Henley Beach (AU)

(73) Assignee: SMR Patents S.à.r.l., Luxembourg (LU)

( * ) Notice: Subject to any disclaimer, the term of this patent is extended or adjusted under 35 U.S.C. 154(b) by 210 days.

(21) Appl. No.: 15/994,297

(22) Filed: May 31, 2018

(65) Prior Publication Data

US 2019/0111847 A1 Apr. 18, 2019

Related U.S. Application Data

(60) Provisional application No. 62/573,085, filed on Oct. 16, 2017.

(51) Int. Cl.
| | |
|---|---|
| *G03B 21/14* | (2006.01) |
| *F21V 8/00* | (2006.01) |
| *B60R 1/08* | (2006.01) |
| *B60Q 1/50* | (2006.01) |
| *F21S 43/14* | (2018.01) |
| *F21S 43/19* | (2018.01) |
| *F21S 43/20* | (2018.01) |

(Continued)

(52) U.S. Cl.
CPC .............. *B60R 1/08* (2013.01); *B60Q 1/2665* (2013.01); *B60Q 1/323* (2013.01); *B60Q 1/50* (2013.01); *B60R 1/1207* (2013.01); *B60R 13/005* (2013.01); *F21S 43/14* (2018.01); *F21S 43/19* (2018.01); *F21S 43/26* (2018.01); *F21S 43/27* (2018.01); *G02B 6/005* (2013.01); *G02B 27/0955* (2013.01); *G03B 21/145* (2013.01); *G03B 21/206* (2013.01); *B60Q 2400/40* (2013.01); *B60Q 2400/50* (2013.01); *F21W 2103/25* (2018.01); *F21W 2103/60* (2018.01)

(58) Field of Classification Search
CPC .............. B60R 1/08; B60R 2011/0042; B60R 2011/0059; F21S 43/19; F21S 43/14; F21S 43/20; F21S 43/27; B60Q 1/26; B60Q 1/32; B60Q 1/50
See application file for complete search history.

(56) References Cited

U.S. PATENT DOCUMENTS 9,321,395 B2 * 4/2016 Ammar .................. H05B 47/16
2013/0130674 A1 * 5/2013 De Wind ............. B60Q 1/2619
455/420

(Continued)

*Primary Examiner* — William C. Dowling
(74) *Attorney, Agent, or Firm* — Jones Day

(57) ABSTRACT

A logo lamp device includes a housing having a top, a bottom, a left side, a right side, a front, and a back, a cap covering the top of the housing or preferably an encapsulant, one or more clips formed integrally with or attached to the housing, a connector receiving portion including an opening formed at the back of the housing, a printed circuit board (PCB) fully enclosed within the housing, a light source connected to the PCB and enclosed within the housing, and an optical assembly including at least one optical element for receiving light projected by the light source.

25 Claims, 14 Drawing Sheets

(51) Int. Cl.
*B60R 1/12* (2006.01)
*B60Q 1/26* (2006.01)
*B60R 13/00* (2006.01)
*B60Q 1/32* (2006.01)
*F21S 43/27* (2018.01)
*G02B 27/09* (2006.01)
*G03B 21/20* (2006.01)
*F21W 103/25* (2018.01)
*F21W 103/60* (2018.01)

(56) References Cited

U.S. PATENT DOCUMENTS

| | | | | |
|---|---|---|---|---|
| 2015/0224919 | A1* | 8/2015 | Sobecki | B60Q 1/2615 |
| | | | | 353/13 |
| 2017/0066386 | A1* | 3/2017 | Sawada | B60R 11/0229 |
| 2018/0284581 | A1* | 10/2018 | Nakayama | G03B 21/145 |
| 2019/0096297 | A1* | 3/2019 | Cary | G09F 19/18 |

* cited by examiner

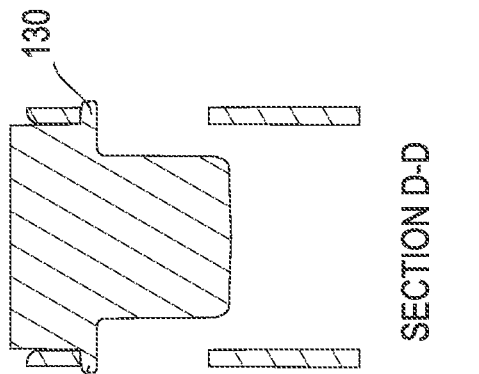
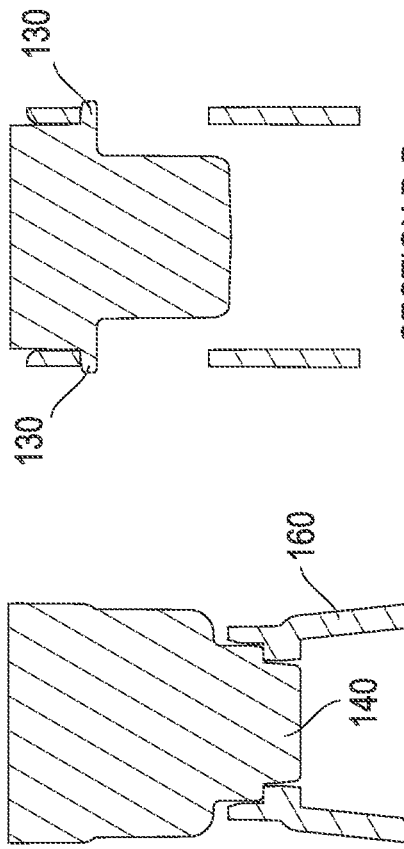
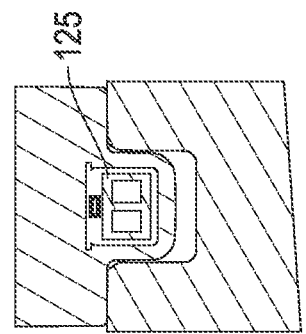
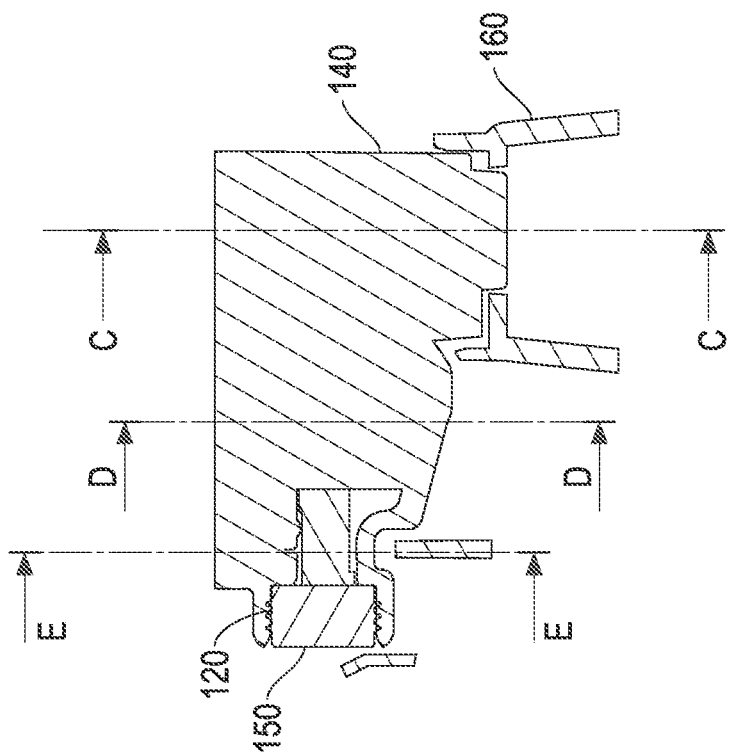

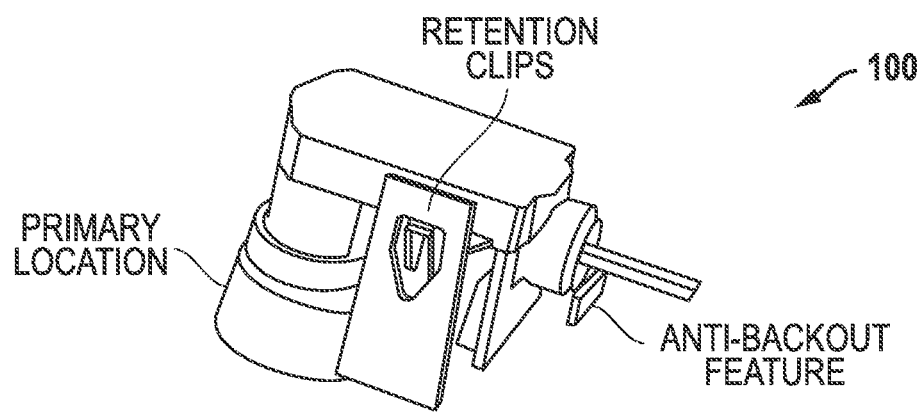
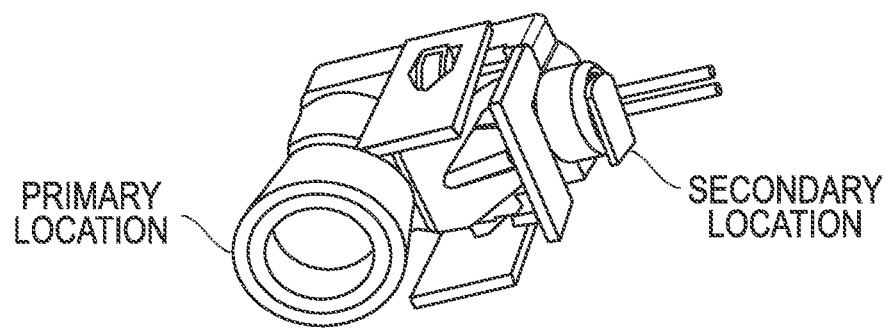
FIG. 17
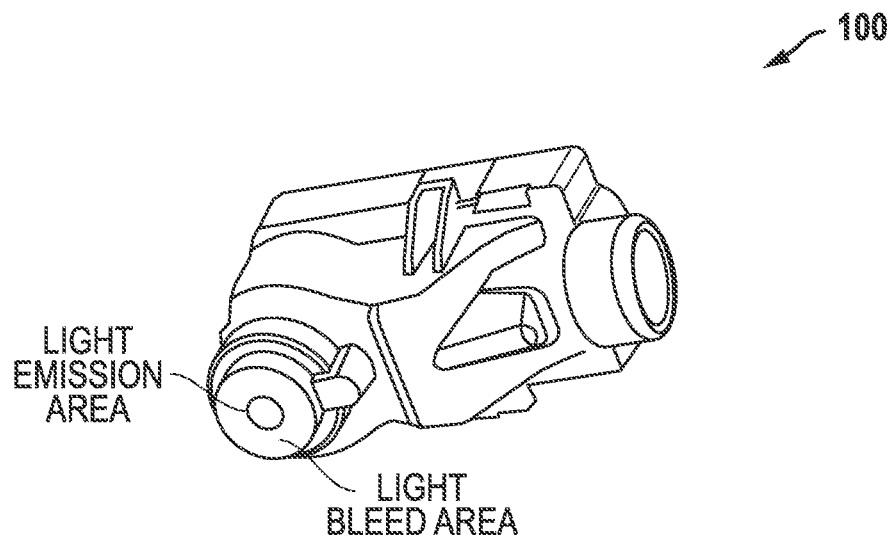
FIG. 18

LOGO LAMP ASSEMBLY AND METHOD OF USING SAME

CROSS-REFERENCE TO RELATED APPLICATIONS

This application claims the benefit of priority under 35 USC § 119(e) of U.S. Provisional Patent Application No. 62/573,085, filed Oct. 16, 2017, which is incorporated herein by reference in its entirety for all purposes.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

1. Field of the Invention

The following description relates to a logo lamp assembly device for projecting a light or a pattern of light adjacent to a vehicle. For example, the logo lamps assembly device may be positioned in the lower side of the rear view system to light up an area adjacent to the vehicle. The logo lamp assembly device may include a mask to allow the projection of the pattern adjacent to the vehicle.

2. Description of Related Art

Typical logo or security lights have been used as a way to improve security around a user while entering their vehicle or to project an aesthetically pleasing logo adjacent to the vehicle. Logo lamp assemblies must be capable of matching a multiplicity of rear view system housing designs. Moreover, they need to be compact so as to fit into the interior cavity of conventional rear view system housings. For styling and aerodynamic reasons, rear view system housings are of determined and restricted size, shape, design, and interior volume. Moreover, the interior volume is already typically cramped as it must accommodate not only the rear view element, such as a mirror reflector or camera, itself and its movement, but also usually a manual or electric actuator that allows adjustment of the rearward field of view of the reflector remotely by the driver from the interior cabin of the vehicle. Also, since it is commercially desirable for a manufacturer of a logo lamp assembly to supply to a multitude of exterior rear view system manufacturers, for their incorporation into their own particular rear view system assembly construction, it is desirable that the light be of a module type that is compact. It is also desirable that the logo lamp assembly is weatherproofed, attachable and receivable by a wide variety of rear view system designs, readily, and conveniently connectable to the vehicle electrical service and wiring found in conventional exterior rear view system assemblies.

Furthermore, the light source should be replaceable without removing and subsequently replacing numerous fasteners. Such fasteners are not only time-consuming to remove and replace, but are subject to getting lost as well as damaged.

U.S. Pat. No. 7,878,693, which is incorporated herein by reference in its entirety for all purposes, describes a rear view mirror assembly with a mirror base attached to a vehicle and a mirror head. The mirror head includes a reflective element and an approach light, the approach light is positioned in the lower side of the mirror assembly to light up an area adjacent to the vehicle. The approach light includes a mask to allow the projection of the pattern adjacent to the vehicle. A typical approach light, as described in U.S. Pat. No. 7,878,693, must be connected to wiring within a mirror assembly by a multiple step procedure involving different electrical systems and may be difficult to plug and unplug into the mirror assembly system. It may also be difficult to secure a typical approach light, and to attach the approach light securely to the mirror assembly. The typical approach light, such as the light described in U.S. Pat. No. 7,878,693, does not include, among other things, a housing having an interface structure, a printed circuit board, or a connector receiving portion configured to fittingly receive a connector from a vehicle.

BRIEF DESCRIPTION OF THE SEVERAL VIEWS OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention.

FIG. 5 is a diagram illustrating a cross-sectional view of the logo lamp assembly device along the sectional cut B-B shown in FIG. 1.

FIG. 6 is a diagram illustrating a cross-sectional view of the logo lamp assembly device along the sectional cut C-C shown in FIG. 5.

FIG. 7 is a diagram illustrating a cross-sectional view of the logo lamp assembly device along the sectional cut D-D shown in FIG. 5.

FIG. 8 is a diagram illustrating a cross-sectional view of the logo lamp assembly device along the sectional cut E-E shown in FIG. 5

FIG. 17 is a diagram illustrating the attachment of the logo lamp assembly device to an interface structure in a conventional rear view assembly such as a rear view system housing, a rear view system cover, or other plastic part of a rear view assembly.

FIG. 18 is a diagram illustrating the protection lens of the logo lamp assembly device of FIG. 1.

DETAILED DESCRIPTION OF THE INVENTION

Figure 1:
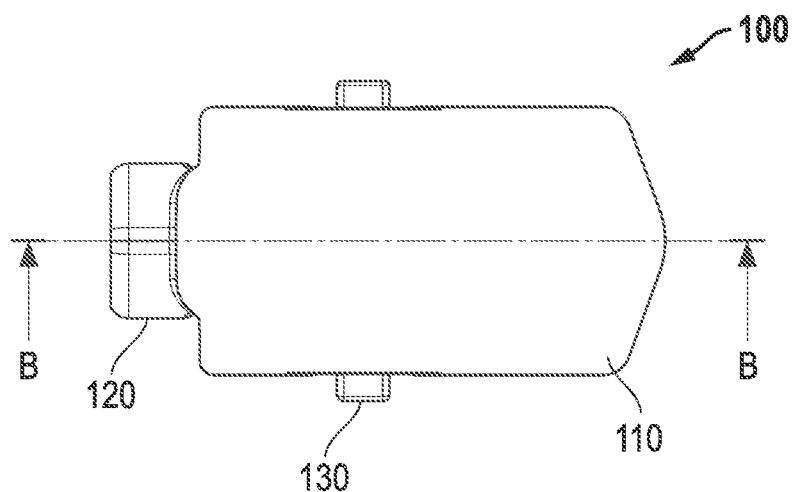
FIG. 1 is a diagram illustrating a top view of a logo lamp assembly device.

Before explaining at least one embodiment of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation—specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, and be within the scope of the present invention FIG. 1 is a diagram illustrating a top view of a logo lamp assembly device 100 with an integrated plug.

Referring to FIG. 1, the logo lamp assembly device 100 includes an assembly housing 110, a pair of clips 130 extending from a left side and a right side of the housing 110, and a connector receiving portion 120, extending from a rear side of the housing 110. The pair of clips 130 are configured to clip onto a rear view system housing, and the connector receiving portion 120 is configured to receive a connector 150 for connecting to the rear view system housing. The connector 150 and connection to the rear view system housing is illustrated and described below in more detail with reference to FIGS. 5-8 and FIG. 22.

Figure 2:
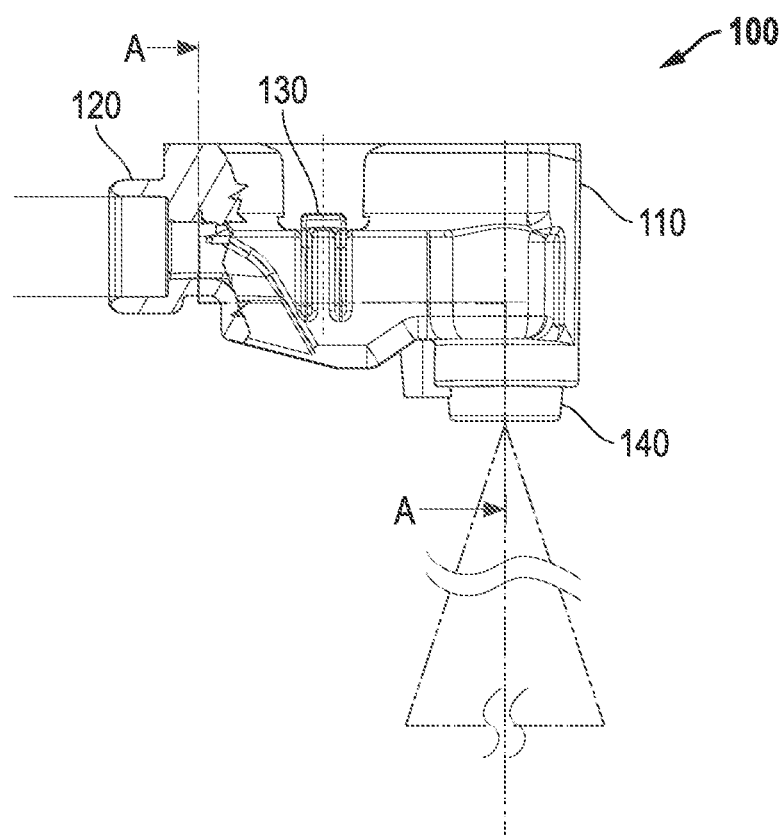
FIG. 2 is a diagram illustrating a left side view of the logo lamp assembly device.

The logo lamp assembly device 100 is configured to be used with a rear view system or rear view assembly (not shown) such as for a vehicle, preferably a motor vehicle. The rear view system assembly may be a two part rear view system with a foldable axis including a rear view system base and a rear view system head. The rear view system head may include a reflective element. The logo lamp assembly device 100 may be integrated into the rear view system assembly in multiple positions in the rear view system base and the rear view system head. In other examples, the logo lamp assembly device 100 may also be integrated into other components of a motor vehicle aside from the rear view system assembly. The logo lamp assembly device 100 emits light defined by a light cone as illustrated in FIG. 2. While the logo lamp may project a logo, it is not limited to such and may project any pattern or non-patterned light. The light is projected on the ground which is commonly adjacent to the vehicle, but can also impinge the vehicle contour.

FIG. 2 is a diagram illustrating a left side view of the logo lamp assembly device.

Referring to FIG. 2, the housing 110 further includes a lens receiving portion 140 where a lens may be positioned. As illustrated in the figure, the lens receiving portion 140 projects outwardly from the bottom of the housing 110 so that a light cone may be projected onto the ground from the logo lamp assembly device 100. In an example, the light or logo projected may form an image having at least a 100 millimeter diameter, at least a 200 millimeter diameter, at least a 300 millimeter diameter, at least a 400 millimeter diameter, at least a 500 millimeter diameter, at least a 600 millimeter diameter, at least a 700 millimeter diameter, or at least a 800 millimeter diameter. The projected image may also have a diameter that is at most 100 millimeters, at most 200 millimeters, at most 300 millimeters, at most 400 millimeters, at most 500 millimeters, at most 600 millimeters, at most 700 millimeters, or at most 800 millimeters.

Figure 3:
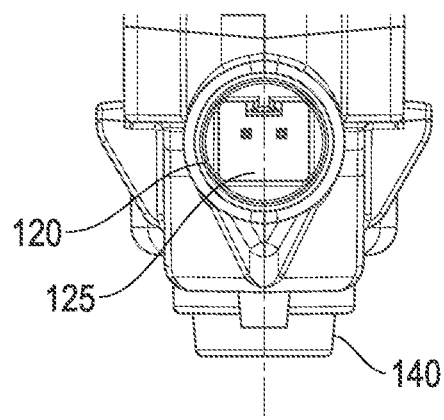
FIG. 3 is a diagram illustrating a rear view of the logo lamp assembly device.

FIG. 3 is a diagram illustrating a rear view of the logo lamp assembly device 100.

Referring to FIG. 3, the connector receiving portion 120 projects from the rear of the logo lamp assembly device 100, and the lens receiving portion 140 projects outwardly from the bottom. The connector receiving portion 120 includes a hollow opening for receiving a connector and housing the integrated electrical connection 125 within the logo lamp assembly device 100. The integrated electrical connection 125 within the connector receiving portion 120 allows for easy connection and interface with a power providing connector of the rear view system assembly. This allows for convenience and provides the advantage of the logo lamp assembly device 100 being attachable and receivable by a wide variety of rear view system assembly designs; that is readily, standardly, and conveniently connectable to the vehicle electrical service and wiring already commonly found in conventional rear view system assemblies.

Figure 4:
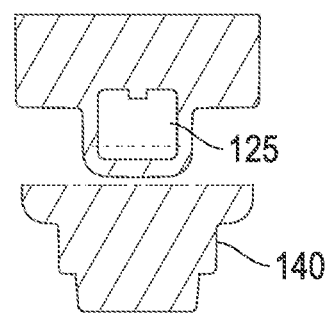
FIG. 4 is a diagram illustrating a cross-sectional view of the logo lamp assembly device along the sectional cut A-A shown in FIG. 2.

FIG. 4 is a diagram illustrating a cross-sectional view of the logo lamp assembly device along the sectional cut A-A shown in FIG. 2. Referring to FIG. 4, the cross-sectional cut A-A of FIG. 2 is shown including a cross-section of the electrical connection 125 portion hosing the electronics within the connector receiving portion 120, and the lens receiving portion 140.

FIGS. 5-8 are diagrams illustrating the connection and interface between a rear view system assembly and logo lamp assembly device 100. In particular, FIG. 5 is a diagram illustrating a cross-sectional view of the logo lamp assembly device along the sectional cut B-B shown in FIG. 1, FIG. 6 is a diagram illustrating a cross-sectional view of the logo lamp assembly device along the sectional cut C-C shown in FIG. 5, FIG. 7 is a diagram illustrating a cross-sectional view of the logo lamp assembly device along the sectional cut D-D shown in FIG. 5, and FIG. 8 is a diagram illustrating a cross-sectional view of the logo lamp assembly device along the sectional cut E-E shown in FIG. 5.

Referring to FIG. 5, the connector receiving portion 120 may receive a connector 150 for interfacing with the rear view system assembly 160 and providing power to the logo lamp assembly device 100. In addition, the lens receiving portion 140 may be received by the housing of the rear view system assembly 160 at a position in the rear view system assembly 160 which allows light to be projected to the floor. For example, this position may be on the bottom portion of the housing of the rear view system assembly 160 and may include an opening so that light may exit from the bottom of the rear view system assembly 160. As illustrated, the logo lamp assembly device 100 may also include an anti-backout feature to prevent the connector 150 from backing out of the connector receiving portion 120.

Referring to FIGS. 6-8, the lens receiving portion 140 is shown received by the housing of the rear view system assembly 160 (FIG. 6), the clips 130 of the logo lamp assembly device 100 are shown clipping a portion of the rear view system assembly 160 (FIG. 7), and the integrated electrical connection 125 within the connector receiving portion 120 is shown interfacing with the connector 150 (FIG. 8). Each of FIGS. 6-8 are cross-sections along the lines C-C, D-D, E-E shown in FIG. 5, respectively.

Figure 9:
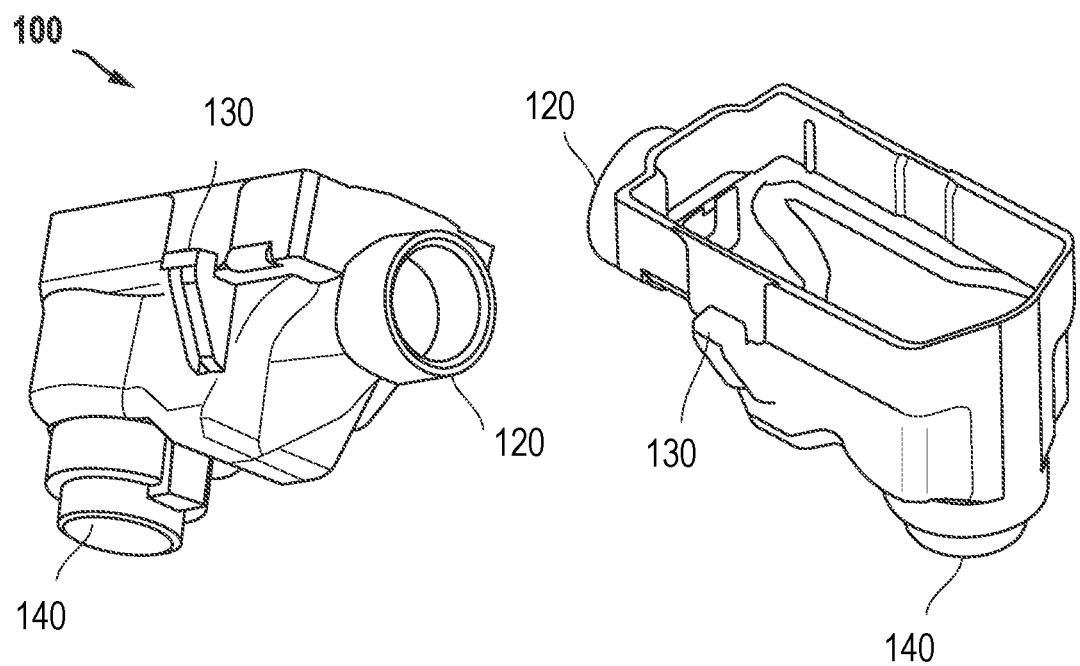
FIG. 9 is a diagram illustrating an isometric view of the logo lamp assembly device of FIG. 1.
Figure 10:
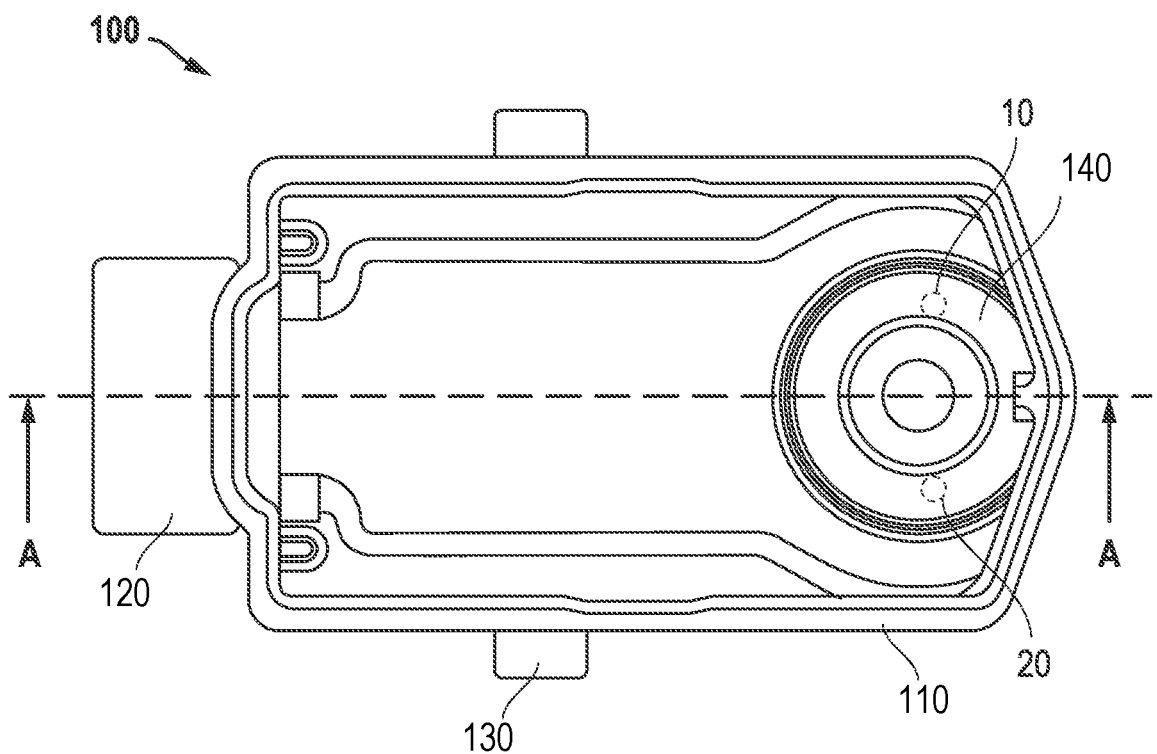
FIG. 10 is a diagram illustrating a top view of the logo lamp assembly device of FIG. 1.
Figure 11:
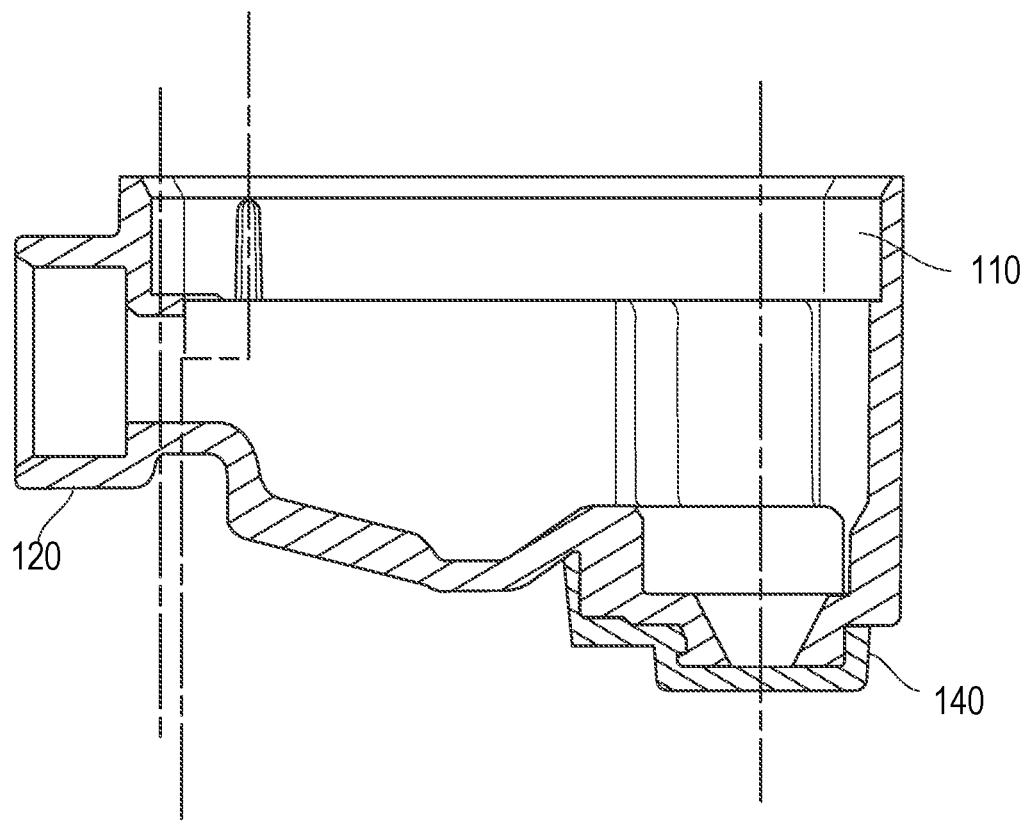
FIG. 11 is a diagram illustrating a cross-sectional view of the logo lamp assembly device along the sectional cut A-A shown in FIG. 10.
Figure 12:
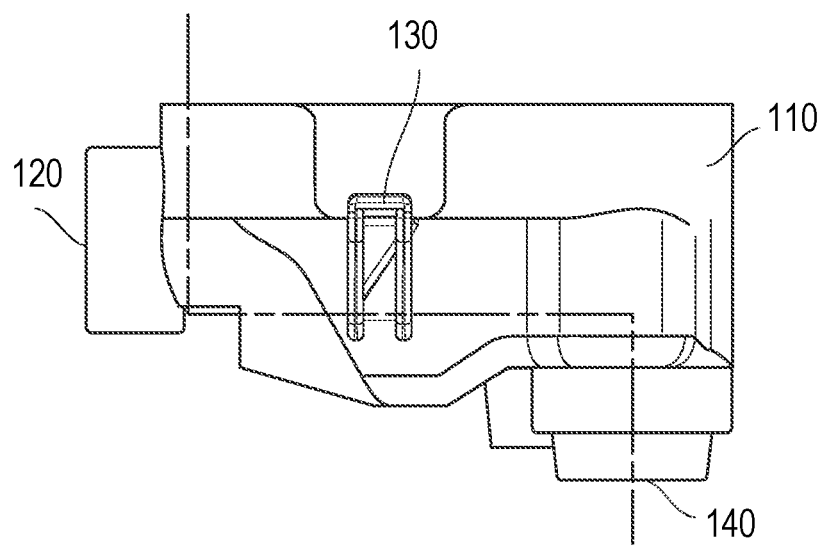
FIG. 12 is a diagram illustrating a side view of the logo lamp assembly device of FIG. 1.

FIG. 9-12 are additional diagrams illustrating the logo lamp assembly device of FIG. 1. FIG. 9 is a diagram illustrating isometric views, FIG. 10 is a diagram illustrating a top view of the logo lamp assembly device of FIG. 1, FIG. 11 is a diagram illustrating a cross-sectional view of the logo lamp assembly device along the sectional cut A-A shown in FIG. 10, FIG. 12 is a diagram illustrating a side view of the logo lamp assembly device of FIG. 9, Referring to FIG. 9, the logo lamp assembly device 100 includes an assembly housing 110, a pair of clips 130 extending from a left side and a right side of the housing, and a connector receiving portion 220, extending from a rear side of the housing. The pair of clips 130 are configured to clip onto a rear view system housing, and the connector receiving portion 120 is configured to receive a connector for connecting to the rear view system housing. The logo lamp assembly device also includes a top cap or encapsulant which covers the logo lamp assembly. In one embodiment, the top cap is a solid top cap which is glued or welded onto the top or may be attached by another attachment means which is known in the art. In a preferred embodiment, the logo lamp assembly uses an encapsulant 190 rather than a top cap. The encapsulant 190 is described in more detail in reference with FIG. 13 below.

Referring to FIG. 10, the logo lamp assembly device 100 may include two indentations, marks, grooves, protrusions or holes 10, 20 which indicate the position of receiving the optical elements in the lens receiving portion 140. For example, it can be appreciated that two protrusions 30 extending out of the projector 170 shown in FIG. 16 can fit directly into the indentations, marks, grooves, protrusions or holes 10, 20 of the logo lamp assembly device housing for easy fit of the lens.

Referring to FIGS. 11 and 12, the logo lamp assembly device 100 of this example includes at least two materials. As shown in the Section A-A of FIG. 11, the first material (right to left cross-hatch) may form the housing and may be an opaque plastic or other material, the second material (left to right cross-hatch) may be a protective covering which is a part of and covers the optical elements. That is, the protective covering may be a protective lens which is formed of a transparent material such as a PMMA material.

Figure 13:
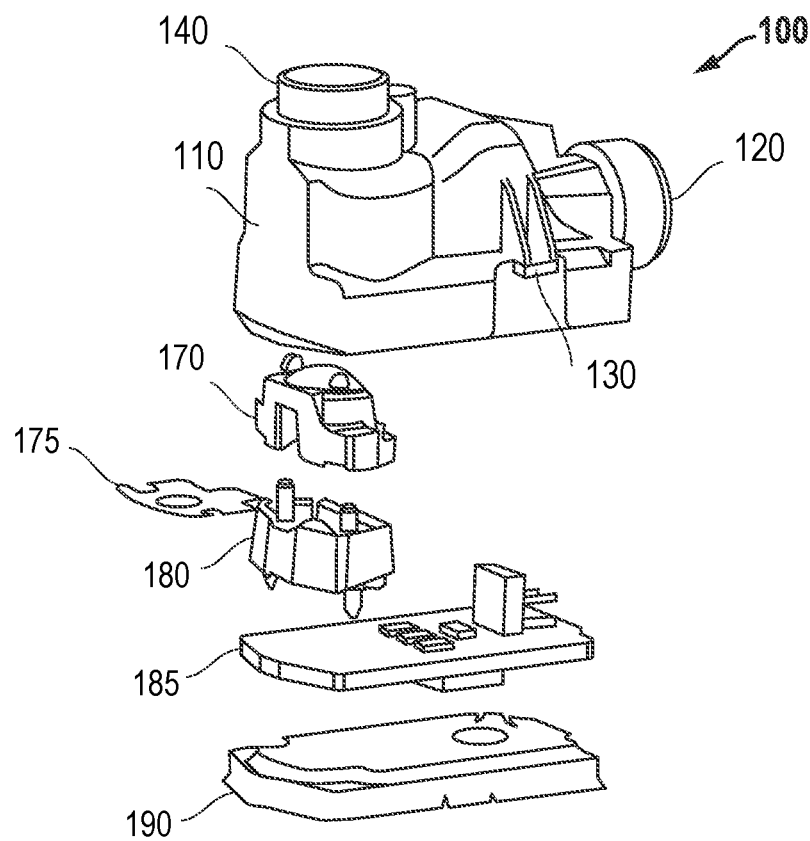
FIG. 13 is a diagram illustrating an exploded view of the logo lamp assembly device showing the arrangement of optical elements including a first lens, a second lens, a printed circuit board, a top cap or encapsulant, and a mask or image according to an example.

FIG. 13 is a diagram illustrating an exploded view of the logo lamp assembly device 100 showing the arrangement of optical elements including a first lens 180, a second lens 170, a printed circuit board 185, a top cap or encapsulant 190, and a mask or image 175 according to an example.

Referring to FIG. 13, the optical elements are arranged in an order with a light source formed on a printed circuit board (PCB) 185 first, followed by a first lens 180, followed by a mask (or image) 175, followed by a second lens 170. In this example, the first lens 180 may be a condenser and the second lens 170 may be a projector. While this is an example of the arrangement of the optical elements, the arrangement is not limited thereto. It should be noted that the light source is arranged above the lenses 170, 180 with a mask 175 between the two lenses 170, 180, and that the light source projects light at a direction generally perpendicular to the plane of the lenses 170, 180 and the mask 175 so that the optical elements are arranged without being at an angle with respect to one another.

Still referring to FIG. 13, the optical elements may be assembled easily one above the other starting with the indentations, marks, grooves, protrusions or holes 10, 20 of the logo lamp assembly device housing 110 being fitted with protrusions of the projector 170, followed by a mask 175 which may have a cut with holes to be fitted between protrusions of the projector 170 and the condenser 180, and the condenser 180 may have protrusions on both ends fitting on one side onto the projector 170 and on the other side through the PCB 185 and into the encapsulant 190 or top cover. Referring to the PCB 185 in the exploded view, it can be seen that the electronics to be interfaced with the connector are on one side and the light source is on the opposite side of the PCB 185. This is because the light source is above the lenses on the one side while the electronics are positioned at the connector receiving portion of the logo lamp assembly device housing 110. This provides the advantage of a compact housing 110 which may easily interface with a connector on the one hand and project light directly at adjacent lenses on the other hand.

Figure 14:
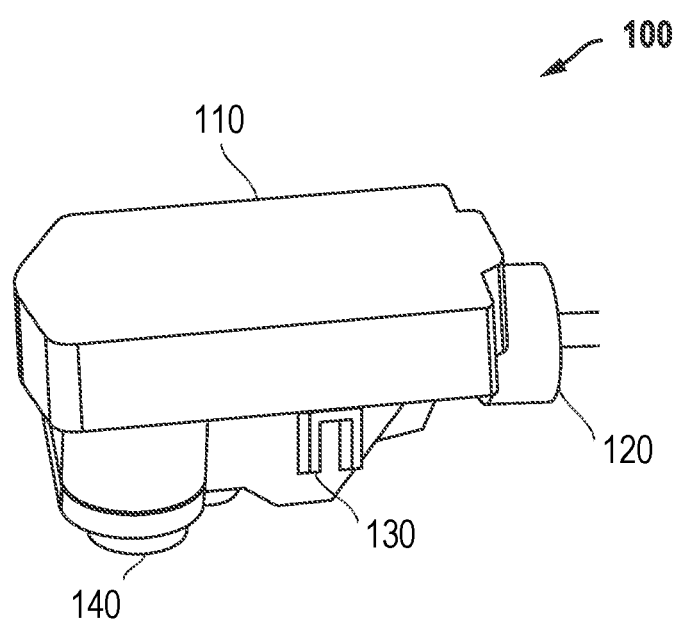
FIG. 14 is a diagram illustrating a perspective view of the logo lamp assembly device.

FIG. 14 is a diagram illustrating a perspective view of the logo lamp assembly device 100. As discussed above, the logo lamp assembly device 100 may also include a top cap or encapsulant 190 which covers the logo lamp assembly 100. In one embodiment, the top cap is a solid top cap which is glued or welded onto the top or may be attached by another attachment means which is known in the art. In a preferred embodiment, the logo lamp assembly uses an encapsulant 190 rather than a top cap.

The encapsulant 190 is a liquid which is initially applied to the top of an open logo lamp assembly device 100. In an example, the open logo lamp assembly device 100 already includes the first lens 180, the second lens 170, the mask 175, and the printed circuit board 185 so that when the encapsulant 190 is applied, it is applied on top of the printed circuit board 185 similar to a coating. It should be appreciated that as a result of the shape of the housing 110 and the printed circuit board 185, the liquid form of the encapsulant 190 does not penetrate past the top portion of the logo lamp assembly device 100 so that the it does not reach the connector area or the lens array. Once the encapsulant 190 is applied in liquid form such as via hot-melt coating, it is set or cured into a solid or more hardened form. The curing process may be any type of curing process including but not limited to heat curing, chemical curing, electron beam curing, and ultraviolet curing. As illustrated in FIGS. 13 and 14, the encapsulant 190 takes the shape of the housing 110 and the top of the printed circuit board 185 once cured thereon.

Figure 15:
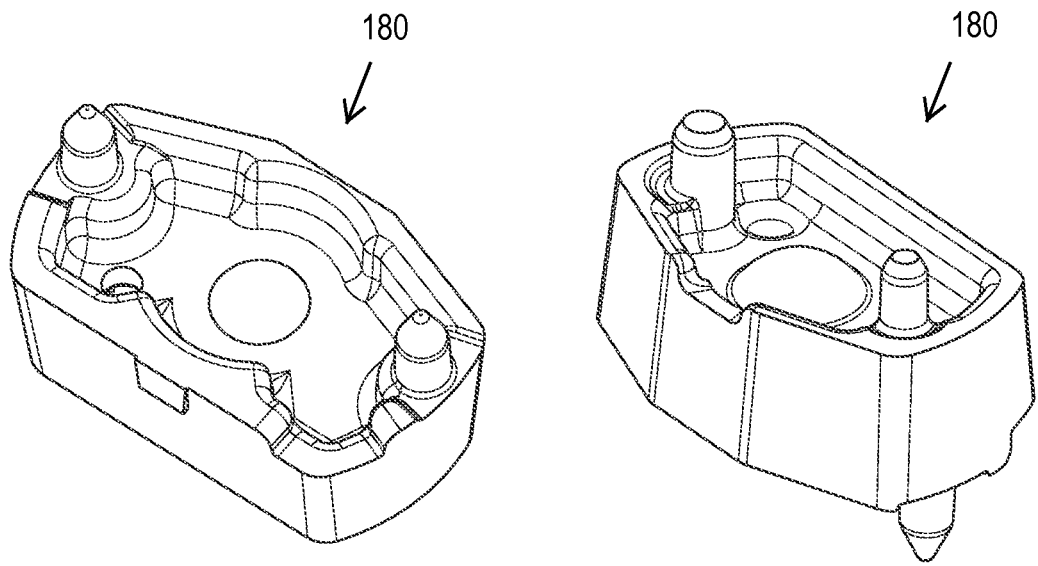
FIG. 15 is a diagram illustrating perspective views of a first lens, in this example, being a condenser.
Figure 16:
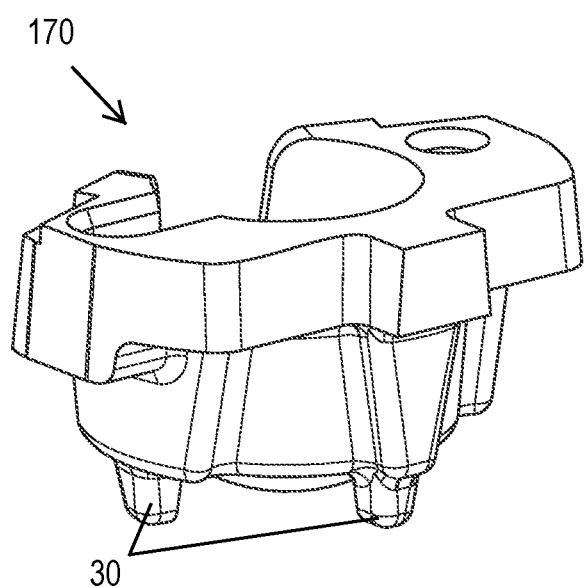
FIG. 16 is a diagram illustrating perspective views of a second lens, in this example, being a projector.

FIG. 15 is a diagram illustrating perspective views of a first lens 180, in this example, being a condenser and FIG. 16 is a diagram illustrating perspective views of a second lens 170, in this example, being a projector. The condenser 180 and the projector 170 may fit onto each other with a mask 175 positioned between and, as discussed in reference to FIG. 13, they fit compactly with other optical elements and the PCB 185 within the logo lamp assembly housing 110.

FIG. 17 is a diagram illustrating the attachment of the logo lamp assembly device 100 to an interface structure in a conventional rear view assembly such as a rear view system housing, a rear view system cover, or other plastic part of a rear view assembly. Referring to FIG. 17, it should be appreciated that a rear view system assembly such as a side view mirror or camera system, may come pre-equipped with an interface structure as shown (dark shaded region). This allows for quick and easy connection of the logo lamp assembly device 100 by clipping and fitting directly with the interface structure. The interface structure may be provided or pre-equipped in a conventional rear view assembly such as a rear view system housing, a rear view system cover, or other plastic part of a rear view assembly.

FIG. 18 is a diagram illustrating a protection lens or cover (shaded region) of the logo lamp assembly 100. The protection lens or cover may cover the optical elements of the logo lamp assembly device and may be transparent in part or fully, or may include different levels of transparency. The protection lens or cover of this example includes a light emission area, which may be an opening or a fully transparent region, and a light bleed area.

Figure 19:
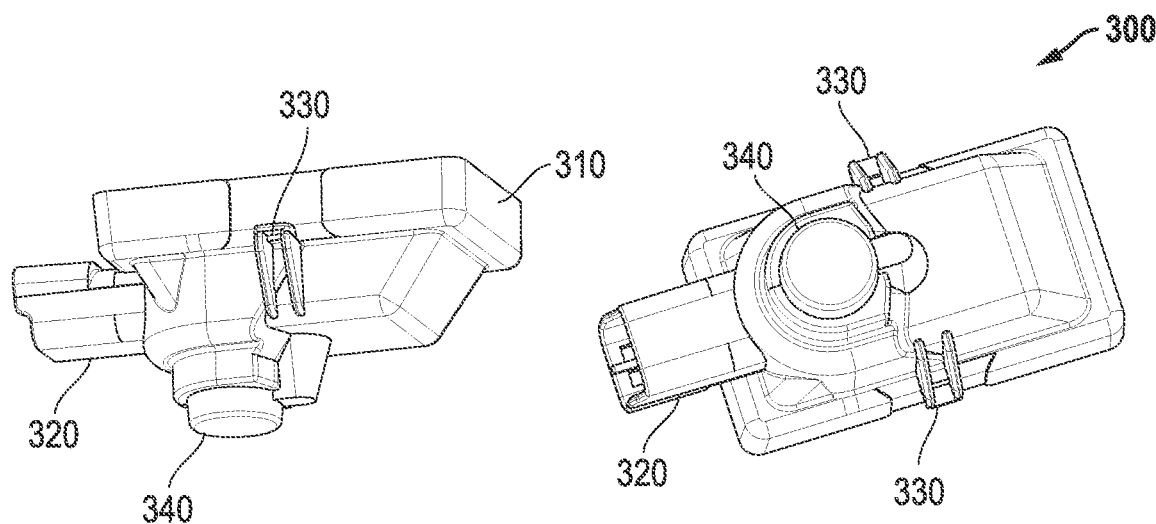
FIG. 19 is a diagram illustrating an isometric view of another example of a logo lamp assembly device.
Figure 20:
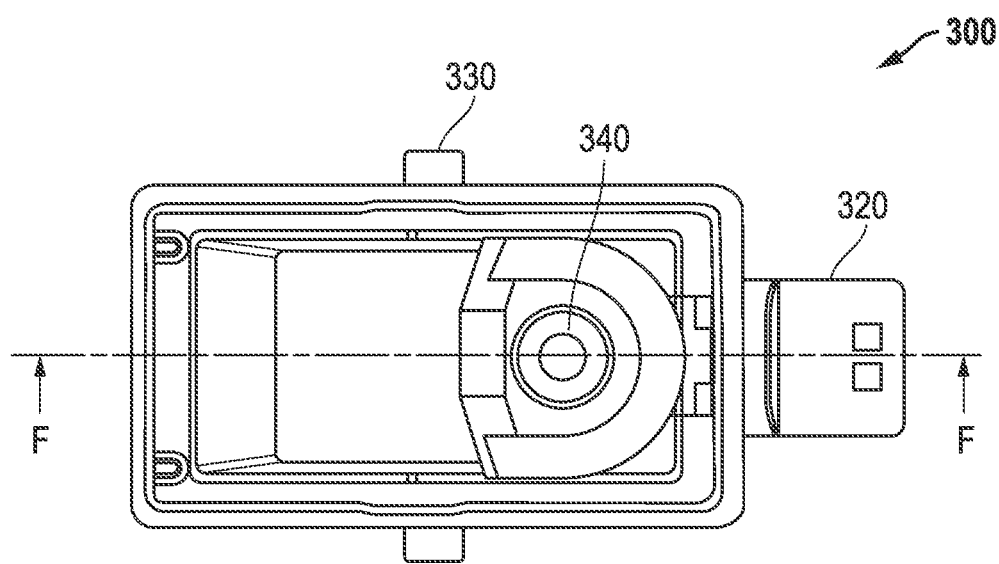
FIG. 20 is a diagram illustrating a top view of the logo lamp assembly device of FIG. 19.
Figure 21:
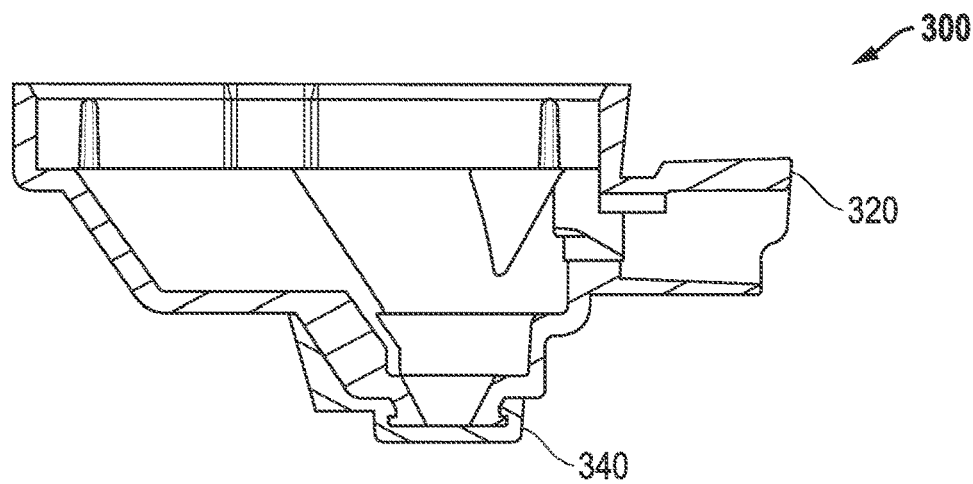
FIG. 21 is a diagram illustrating a cross-sectional view of the logo lamp assembly device along the sectional cut F-F shown in FIG. 20.
Figure 22:
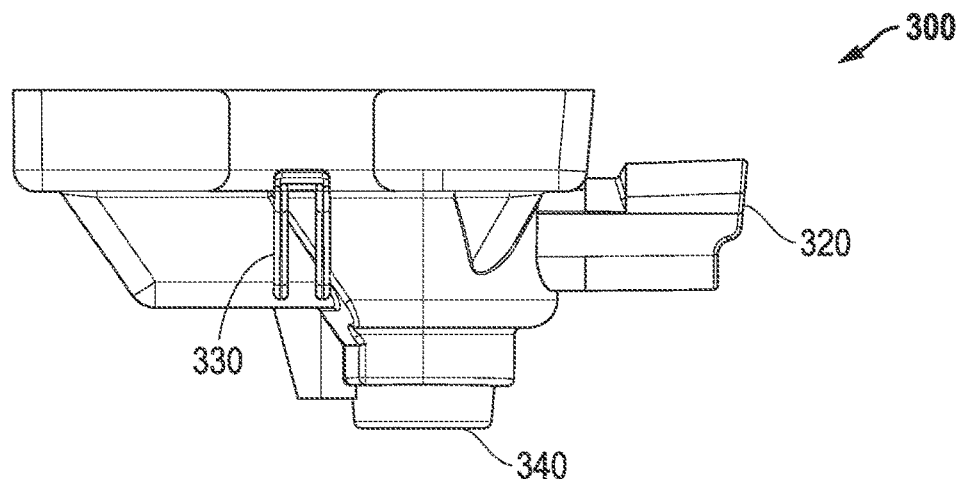
FIG. 22 is a diagram illustrating a side view of the logo lamp assembly device of FIG. 19.
Figure 23:
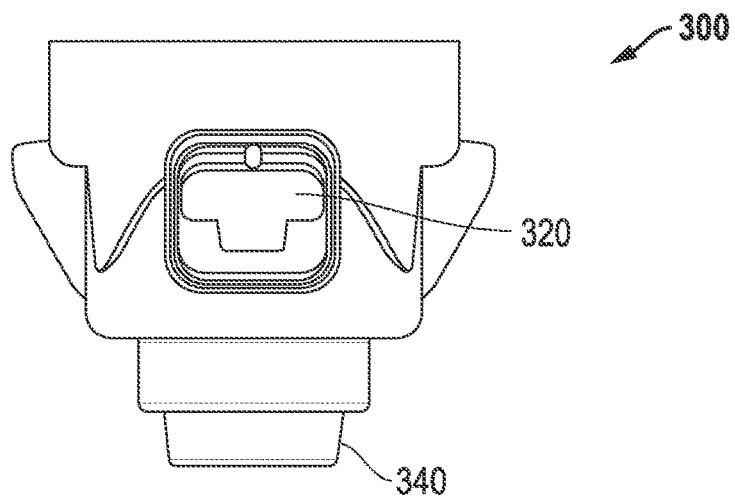
FIG. 23 is a diagram illustrating a rear view of the logo lamp assembly device of FIG. 19.

FIGS. 19-23 are diagrams illustrating another example of a logo lamp assembly device according to a different embodiment. FIG. 19 is a diagram illustrating isometric views, FIG. 20 is a diagram illustrating a top view of the logo lamp assembly device of FIG. 19, FIG. 21 is a diagram illustrating a cross-sectional view of the logo lamp assembly device along the sectional cut F-F shown in FIG. 20, FIG. 22 is a diagram illustrating a side view of the logo lamp assembly device of FIG. 19, FIG. 23 is a diagram illustrating a rear view of the logo lamp assembly device of FIG. 19.

Referring to FIG. 19, similarly to the previous embodiments, the logo lamp assembly device 300 of FIG. 19 includes an assembly housing 310, a pair of clips 330 extending from a left side and a right side of the housing, and a connector receiving portion 320, extending from a rear side of the housing. The pair of clips 330 are configured to clip onto a rear view system housing, and the connector receiving portion 320 is configured to receive a connector for connecting to the rear view system housing. In this example, the connector receiving portion 320 is configured to receive a JAE connector. In another example, such as in the previously described logo lamp assembly device 100, the connector receiving portion may receive a Hanlim connector or any other connector. It should be appreciated that the invention is not limited to connecting to a JAE or Hanlim connector, and these are examples of possible connectors which may be connected to any of the logo lamp assembly devices 100, 300.

Referring to FIG. 20, the logo lamp assembly device 300 may include two indentations, marks, grooves, protrusions or holes which indicate the position of receiving the optical elements in the lens receiving portion 340. For example, referring to FIG. 20 and Section A-A of FIG. 19, it can be appreciated that two protrusions 30 extending out of the projector shown in FIG. 19 can fit directly into the indentations, marks, grooves, protrusions or holes of the logo lamp assembly device housing for easy fit of the lens.

Referring to FIGS. 21-23, the logo lamp assembly device 300 of this example includes at least two materials. The first material may form the housing and may be an opaque plastic or other material, the second material may be a protective covering which is a part of and covers the optical elements. That is, the protective covering may be a protective lens which is formed of a transparent material such as a PMMA material. Different views of the components of the logo lamp assembly device including the clips 330, connector receiving portion 320, lens receiving portion 340, the protective lens are shown throughout FIGS. 21-23 with FIG. 23 being a close up showing the connector receiving portion 320.

Figure 24:
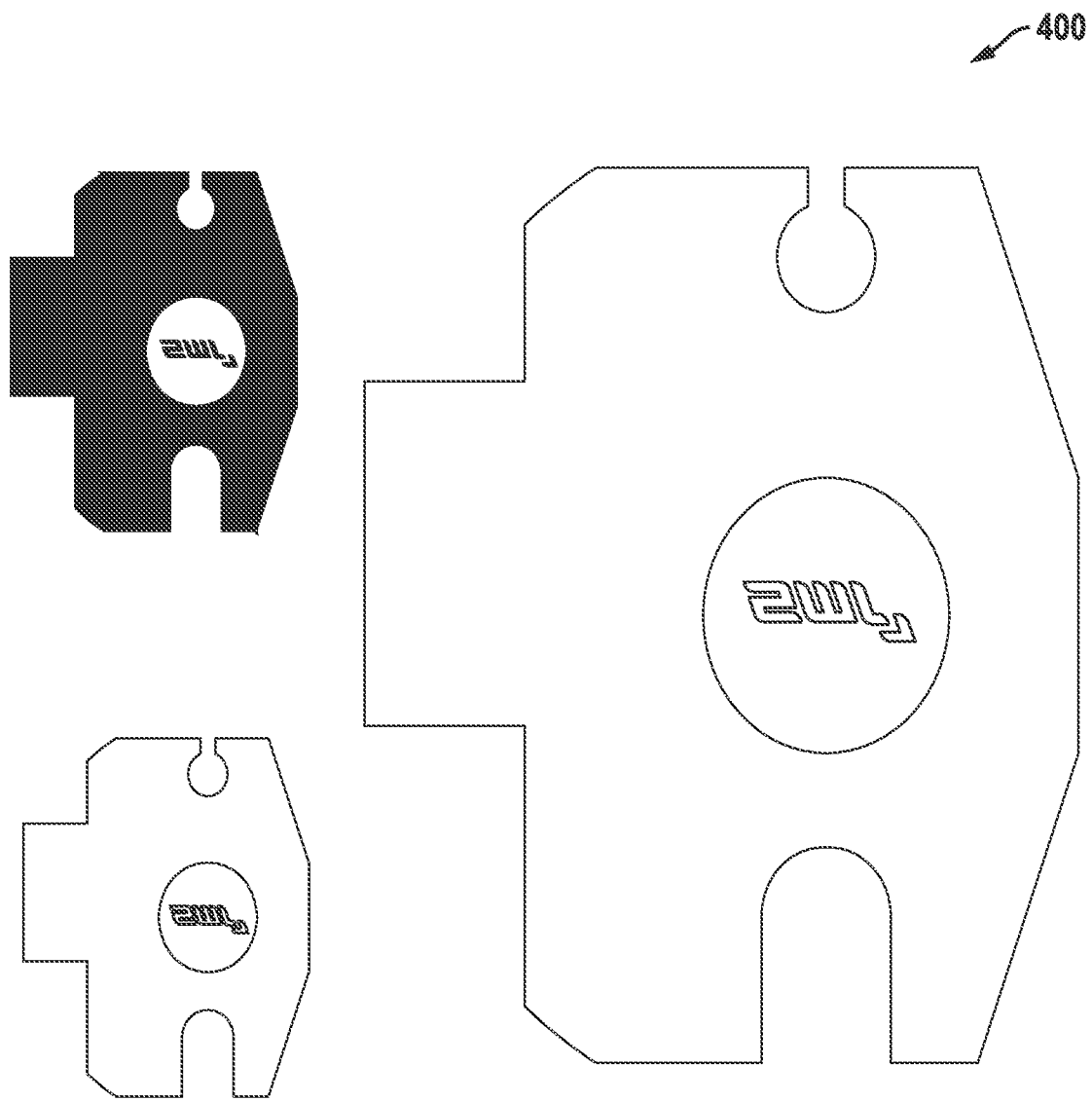
FIG. 24 is a diagram illustrating an example of a mask that may be used with the logo lamp assembly device.

FIG. 24 is a diagram illustrating an example of a mask that may be used with the logo lamp assembly device. Referring to FIG. 24, a mask used with logo lamp assembly devices 100, 300 may include holes, openings, or apertures that correspond to projections on any of the optical elements such as the condenser and/or projector elements.

Figure 25:
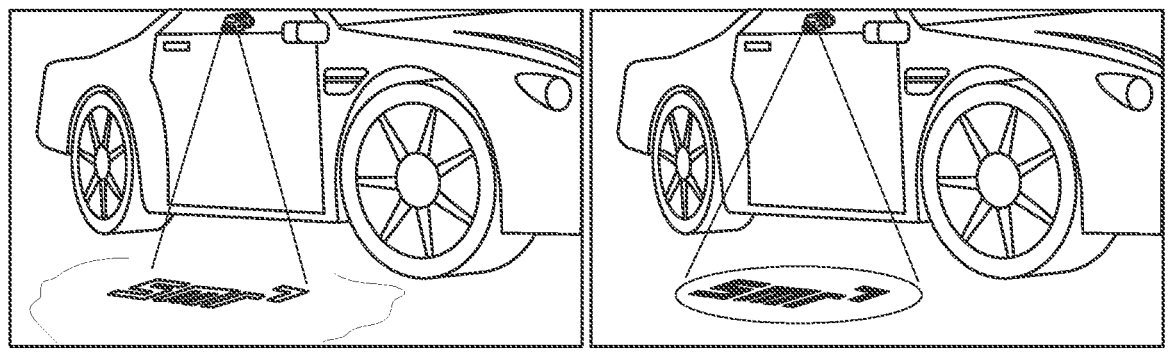
FIG. 25 is a diagram illustrating a negative or positive image projected by the logo lamp assembly device; a negative image (left) may increase the impact of the image whereas a positive image (right) may fulfil the role of a courtesy lamp more effectively.

FIG. 25 is a diagram illustrating a negative or positive image projected by the logo lamp assembly device; a negative image (left) may increase the impact of the image whereas a positive image (right) may fulfil the role of a courtesy lamp more effectively. It should be appreciated that the logo lamp assembly devices 100, 300 may produce a negative or positive image according to a setting of the user and/or according to a mask being used in the logo lamp assembly devices 100, 300.

Figure 26:
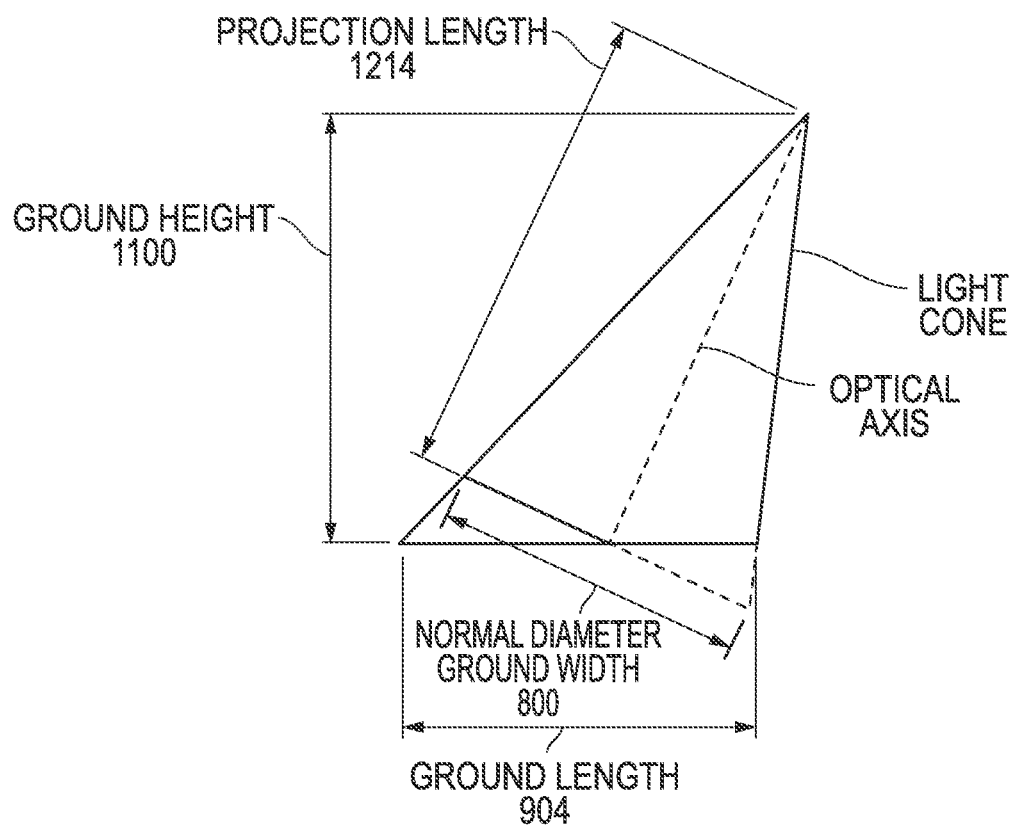
FIG. 26 is a diagram illustrating the projection angle and an elliptical size where the normal diameter is an 800 millimeter circle, the projection angle is 25 degrees and the projection is a 904 millimeter by 800 millimeter ellipse.

FIG. 26 is a diagram illustrating the projection angle and an elliptical size where the normal diameter is an 800 millimeter circle, the projection angle is 25 degrees and the projection is a 904 millimeter by 800 millimeter ellipse. In this example, the angle to the ground is 25 degrees, the projection length is 1214 millimeters, the ground height is 1100 millimeters, the angle of the light cone is 36.48 degrees, the and the ground length is 904 millimeters. The normal diameter ground with is 800 millimeters. It should be appreciated that these projections measurements are only exemplary and the present invention is not limited thereto.

Figure 27:
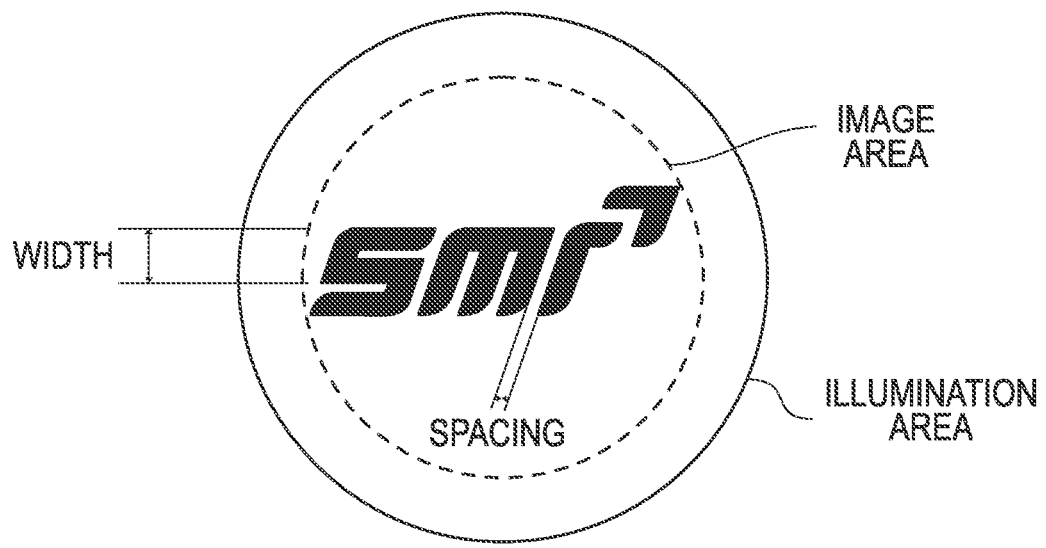
FIG. 27 is a diagram illustrating image design recommendations for an image reproduced by the logo lamp assembly device.

FIG. 27 is a diagram illustrating image design recommendations for an image reproduced by the logo lamp assembly device. According to this example, the recommended image area is a maximum diameter of 600 millimeters with a letter spacing and thickness of a minimum of 5 millimeters where the illumination area is about 800 millimeters. It should be appreciated that these image measurements are only exemplary and the present invention is not limited thereto.

To ensure the image is reproduced clearly it is recommended that the image contain line thicknesses and spacing of greater than 5 millimeters when the image is scaled to suit a 600 mm diameter image area. This correlates to the recommended image cone projected on a 1214 millimeters away normal surface. Any lines or spacing smaller than 5 millimeters at 1214 millimeters projection length may have a proportion of product where they are not well defined or may be perceived as blurred.

Figure 28:
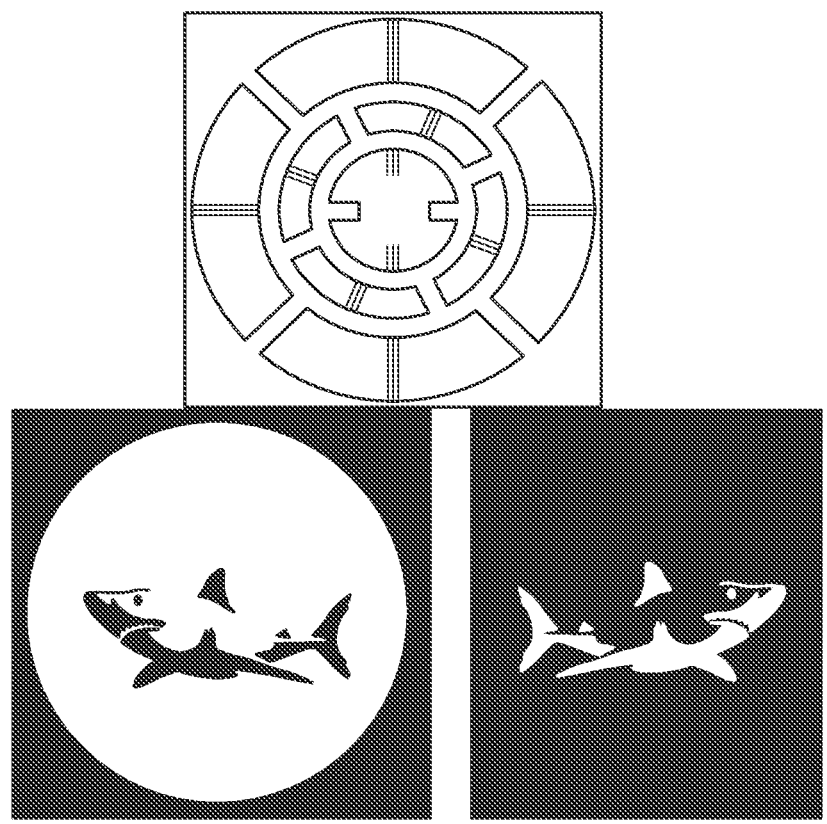
FIG. 28 is a diagram illustrating example photo outputs by the logo lamp assembly device.

FIG. 28 is a diagram illustrating example photo outputs by the logo lamp assembly device.

The logo lamp assembly devices 100, 300 emit light at a wide angle relative to their optical length (to suit a large diameter). This may cause differences in optical path length and refraction angles creating chromatic aberrations, focus and illumination variation. If fine details are required in the desired image it is recommended to be contained towards the center of the image. If the entire image has a high level of detail it may need to be reduced in size from the full illuminated diameter at the discretion of the user based on their acceptance levels. The projected image quality is characterized to the lens design to enable robust manufacturing processes delivering a reliable performance level.

Figure 29:
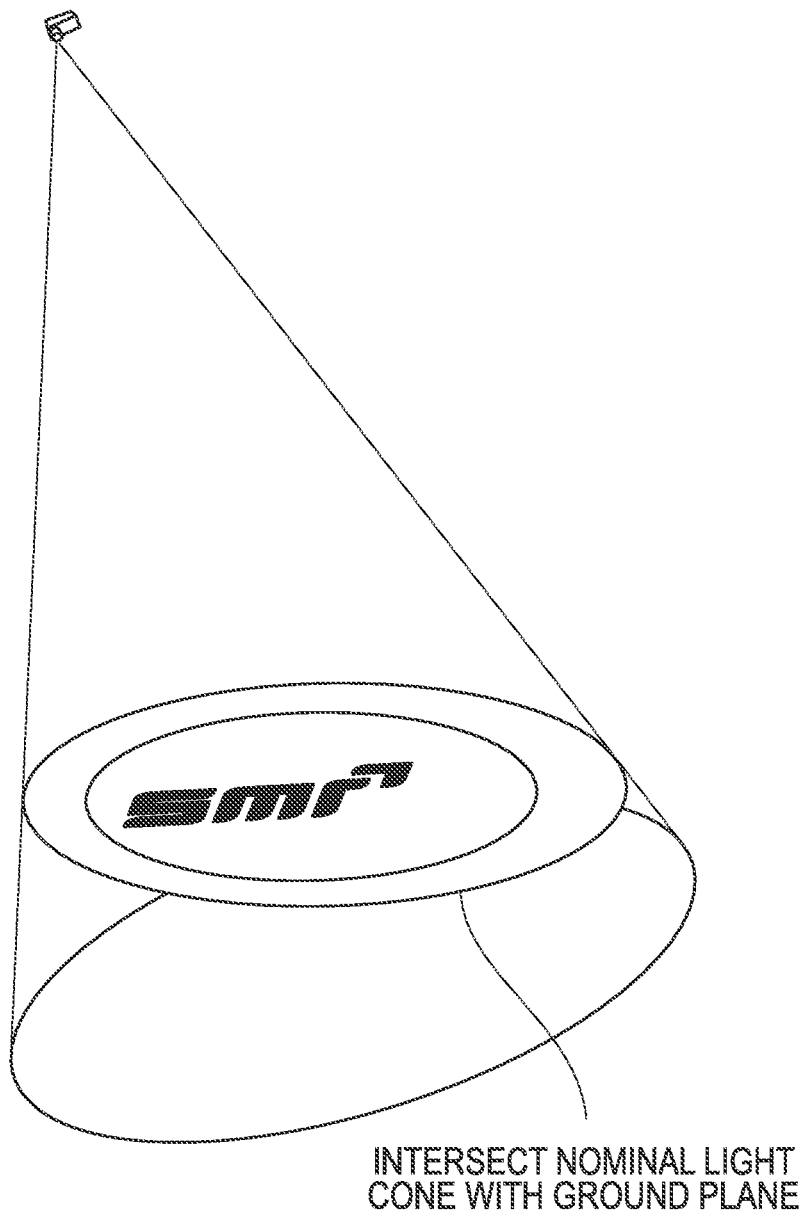
FIG. 29 is a diagram illustrating the projection of a light cone intersecting the ground plane.

FIG. 29 is a diagram illustrating the projection of a light cone intersecting the ground plane. The projection of the light cone and the resulting image may be according to the example dimensions discussed in reference with FIGS. 27 and 28 above.

In an aspect, it should appreciated that advantages of the logo lamp assembly device include providing a plastic optical module with a mask that is securely housed within a compact assembly housing that is easily attachable and detachable from a rear view system assembly. In addition, conveniently positioned clips on the housing allow for clip connection to the rear view system assembly. Further, an integrated and internal plug system and connector receiving portion allows for easy and convenient interfacing with the rear view system assembly.

In another aspect, it should be appreciated that an advantage of the logo lamp assembly device is providing a reduced size device which is easily installable in a side or rear view device. The reduction in size is at least due to reducing the number of lenses and improving lens to LED alignment. For example, where two lenses may typically be used to collect, condense, and collimate the light onto the image or mask, in the present example this is done using only one lens. In addition, the projector/imaging lens is a single lens which controls both the projection angle or spread and a focusing of the image or mask, whereas typically two lenses may provide these functions. In addition, the outer lens or cap is in a single molding with the housing, this may also contain the other optical elements such as the exit pupil, aperture, or stop. The combination of the aperture into the co-molded housing further reduces the size of the device because typically the outer lens or cap is welded on as a separate piece, adding height.

The term "rear view" is here defined as a view of the surrounding area, which is not in the field of view of a driver, i.e. the directions opposing, left, right, below and above of the viewing direction, but can also comprise the view in the direction of the viewing direction of the driver and/or any combinations of the directions.

The term "driver" and "driver of the vehicle" relates here to the person controlling the main parameters of the vehicle, such as for example direction, speed and/or altitude, e.g. normally the person located in the location specified for the controlling person, for example a seat, but can also relate to any other person or entity within or outside of the vehicle.

Different functions and devices can be incorporated into and/or controlled with the help of rear view devices. Of particular interest are functions and devices to enhance, extend and/or sustain the functionality of the rear view device during normal or extreme conditions. This can comprise heating and/or cooling means, cleaning means such as wipers, liquid and/or gaseous sprays, actuator means for moving the rear view device or parts of it, such as for example a display, a camera system and/or parts of a camera system, comprising for example lenses, filters, light sources, adaptive optics like deformable mirrors, sensors and/or mirrors, and/or actuator means for inducing movement of other objects, for example parts of the vehicle and/or objects surrounding the vehicle. Furthermore it can comprise linear tracks and/or rotating wheels, like for example a filter wheel, for exchanging optical elements, comprising for example lenses, mirrors, light sources, sensors, adaptive optics like deformable mirrors and/or filters.

Prominent examples for functions and devices incorporated into and/or controlled with the help of rear view devices comprise illumination devices, for example any kind of light module like an external light module, an internal light module, a front light, a back light, a fog light, a brake light, an acceleration light, a turn signal, a logo lamp, a puddle light, a flash light, a navigation light, a position light, an emergency light, a spotlight, a green light, a red light, a warning light, a turn signal light module, an approach light, a search light, an information light, a display and/or any combination thereof.

Further examples for functions and devices incorporated into and/or controlled with the help of rear view devices can comprise for example a tiredness detection system, a microsleep detection system, a distance and/or velocity determination system, for example a LIDAR (Light detection and ranging) system, a blind spot indicator system, a lane change assistant system, a navigation assistant system, a tracking assistant system, a human-machine interaction system, a machine-machine interaction system, an emergency and precaution assistant system, like an accident avoiding assistant system, a counter-measures assistant system, a brake assistant system, a steering assistant system, an acceleration assistant system, an escape assistant system, comprising for example an ejection seat system, a direction indicator, a blind spot indicator, an approach system, a strong braking system, an emergency braking system, a charging status indicator, a vehicle mode system, comprising for example a sports mode system, an economy mode system, an autonomous drive mode system, a sleep mode system and an anti-theft system, a vehicle locked indicator system, a vehicle stolen indicator, a warning signal system, a temperature indicator system, a weather indicator system, a traffic light signal system, a fuel status system and/or any combination thereof.

A camera module to be used in a rear view device can comprise a plurality of different optical elements, a.o. a variety of sensors and light sources, as well as housing parts. The housing of a camera module can be made out of plastic, metal, glass, any other suitable material and/or any combinations thereof and can be used in combination with the techniques described below to change or modify the properties of the material or the material surface. Housings are for example described in German patent application No. 102016108247. Further, the camera can comprise for example CCD or CMOS or light field sensors, as for example described in German patent application No. 102011053999. Also an area of the sensor can be reserved for different purposes, for example to detect a test beam, as described in U.S. Pat. No. 8,031,224, which is hereby incorporated by reference in its entirety for all purposes. The camera module can also be equipped with apparatuses for light intensity adjustment as described for example in U.S. patent application Ser. No. 14/809,509, which is hereby incorporated by reference in its entirety for all purposes, and light level intensifier tubes as described in U.S. patent application Ser. No. 09/771,140, which is hereby incorporated by reference in its entirety for all purposes. Still further, the camera module or a cover adapted to the camera module can be moved using different actuators, drives and/or a flexible track, as for example described in German application No. 102016108247.3.

The camera module can also comprise cleaning elements to clean the optical element facing outwards and being exposed to the environment. The cleaning element can for example comprise wipers, brushes, lips, nozzles, fans and similar elements as are described in European patent application No. 14165197.6, European patent application No. 13163677.1, and European patent No. 1673260 corresponding to US patent application No. 2007/273971, each of which is hereby incorporated by reference in its entirety for all purposes. The cleaning devices are not limited in composition, and may for example comprise any fabric, elastomeric, sponge, brush, or combination of these. Special wiper elements comprising wiper arms, wiper blades, wiping cloth, wiping tissue and combinations thereof are described in European patent application No. 14165197.6. A reservoir for holding a cleaning liquid is described in European patent application No. 14165197.6. Such a reservoir can be attached to or integrated into the camera module to provide the cleaning liquid to the optical elements of the camera module. Different methods may be used to detect dirt or other obscurations preventing or reducing the functioning of the camera module, such as described in U.S. Pat. No. 8,395,514, European patent No. 1328141, and U.S. Pat. No. 8,031,224, each of which is hereby incorporated by reference in its entirety for all purposes. Also light sources can be installed or integrated into the camera module to increase the visibility of surrounding objects, measure distances and directions and detect dirt, such as described in U.S. Pat. No. 8,031,224, U.S. patent application No. 62/470,658, and U.S. patent application Ser. No. 09/771,140, each of which is hereby incorporated by reference in its entirety for all purposes.

Different heating means, like heating coils, heating devices integrated into the lens holder or the bezel, or other heating elements can be used to impede condensation and icing at the surface of optical elements, as for example described in German patent application No. 102016108247.3, U.S. patent application No. 62/470,658, and German patent application No. 102016107545.0, each of which is hereby incorporated by reference in its entirety for all purposes.

A watertight seal against weather effects, as well as against the influence of washing processes with detergents, solvents and high pressure cleaners can be used on the housing of the camera module as described in U.S. patent application Ser. No. 13/090,127, which is hereby incorporated by reference in its entirety for all purposes. Alternatively, the housing can be made of a body comprising plastic and conductive material, wherein the conductive material is dispersed in the plastic material to form a conductive mass to allow a power source, preferably a DC voltage source, to connect via at least two electrodes to the body and heat the body accordingly, as described in German patent application No. 102016107545.0. Different types of fixings can be used to fix the camera module to the vehicle or other components, such as for example the snap-fit connection described in U.S. Pat. No. 8,979,288, which is hereby incorporated by reference in its entirety for all purposes.

Thus, rear view devices are widely known from the prior art, in particular in the form of rear view mirrors. They generally comprise a base, which is affixed to a vehicle, and a head which carries at least a mirror glass and/or a camera and often additional elements such as side turn indicators or the like. The head is usually mounted pivotally movable with respect to the base. This allows the head to move out of the way in case of a minor collision, thereby preventing damage to the head or injury to pedestrians who get hit by the rear view device. Furthermore, the head can be pivoted, either manually or by means of an automatic folding system, from an operating position, in which the rear view device enables the driver of the vehicle to receive a view in particular to the back, to a parking position, in which the head is folded against the side of the vehicle. This reduces the lateral extent of the vehicle with the mirror in the parking position and prevents accidental damage to the mirror of a parked vehicle.

Shape memory alloys (SMA) are used for various functions with rear view devices. US patent application No. 2016/347252, which is hereby incorporated by reference in its entirety for all purposes, relates to an actuator device for a rear view device of a motor vehicle comprising: at least one retaining element; at least one adjusting element which can be transferred into a plurality of functional positions, in particular from a parking position into at least one operating position; at least one driving means which comprises at least one shape-memory element which is, in particular, in the form of a wire, which extends between the retaining element and the adjusting element and can be or is secured to both, where the extension of said shape-memory element can be modified on being actuated, in particular on being electrically energized, and by means of the modification of the extension of which the at least one adjusting element can be transferred from one functional position into another functional position, in particular from the parking position into the operating position or vice versa; at least one heat-conducting means which lies in contact with the driving means at least in the end position of the adjusting element; and wherein at least one switching means, by means of which the at least one driving means and the at least one heat-conducting means can be or are arranged with respect to one another with no contact in the basic position of the adjusting element and/or by means of which the at least one driving means and the at least one heat-conducting means can be or are arranged touching one another at least in sections at least in the end position of the adjusting element. A further actuator for an exterior rear view mirror of a vehicle is known from European patent application No. 2781743 and has at least one actuator pin, at least one drum body enclosing a cavity, in which the actuator pin can be arranged or is arranged in a non-rotational manner, at least one clamping means which comprises at least one shape-memory element which can be fixed or is fixed to the drum body and with which the drum body can be moved in a first rotational direction, and at least one return means which comprises at least one shape-memory element which can be fixed or is fixed to the drum body and with which the drum body can be moved in a second rotational direction, characterized in that the clamping means and/or the return means can be fixed or are fixed on a winding portion of the drum body and in the winding portion of the drum body at least quarter of a winding, in particular at least half a winding, in particular an entire winding, in particular several windings are applied.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention.

The invention claimed is:

1. A logo lamp device, comprising:
a housing having a top, a bottom, a left side, a right side, a front, and a back;
one or more clips formed integrally with or attached to the housing;
a connector receiving portion comprising an opening formed at the back of the housing;
a printed circuit board (PCB) enclosed within the housing;
at least one light source connected to the PCB and enclosed within the housing;
an optical assembly comprising at least one optical element configured to receive light projected by the at least one light source; and
an encapsulant on top of the housing and the printed circuit board, wherein the encapsulant is formed from a liquid material that is configured to be cured to form a hardened material in response to being cured.

2. The logo lamp device of claim 1, wherein the connector receiving portion projects outwardly from the back of the housing.

3. The logo lamp device of claim 1, wherein the one or more clips are configured to clip onto an outside part of a vehicle.

4. The logo lamp device of claim 1, further comprising a lens receiving portion comprising a lens, the lens receiving portion projecting outwardly from the bottom of the housing so that a light cone may be projected from the logo lamp device.

5. The logo lamp device of claim 1, further comprising an integrated electrical connection configured to connect with a connector received by the connector receiving portion for providing power to the logo lamp device.

6. The logo lamp device of claim 1, further comprising an anti-backout blocker to prevent a connector received by the connector receiving portion from detaching from the logo lamp device.

7. The logo lamp device of claim 1, wherein the encapsulant is configured to be cured using at least one of heat curing, chemical curing, electron beam curing, and ultraviolet curing.

8. The logo lamp device of claim 1, wherein due to a shape of the housing and the printed circuit board, the liquid form of the encapsulant does not penetrate to the connector receiving portion or the optical assembly.

9. A logo lamp device, comprising:
a housing having a top, a bottom, a left side, a right side, a front, and a back;
one or more clips formed integrally with or attached to the housing;
a connector receiving portion comprising an opening formed at the back of the housing;
a printed circuit board (PCB) enclosed within the housing;
at least one light source connected to the PCB and enclosed within the housing; and
an optical assembly comprising at least one optical element configured to receive light projected by the at least one light source,
wherein the housing comprises one or more indentations, grooves, protrusions or holes which indicate a position of receiving the optical assembly.

10. The logo lamp device of claim 1, wherein the housing of the logo lamp device is made of at least two different materials.

11. The logo lamp device of claim 10, wherein a first of the at least two different materials is an opaque plastic material and the second of the at least two different materials is a transparent polymethyl methacrylate (PMMA).

12. The logo lamp device of claim 1, wherein the optical element of the optical assembly comprises at least one of a first lens and a second lens.

13. The logo lamp device of claim 12, wherein the optical assembly further comprises a second optical element and a mask, the optical element being the first lens and the second optical element being the second lens.

14. The logo lamp device of claim 13, wherein the first lens is a condenser and the second lens is a projector.

15. The logo lamp device of claim 14, wherein a cap is positioned above the PCB, the PCB is positioned above the condenser, the condenser is positioned above the mask, the mask is positioned above the projector, and the projector is positioned above a lens receiving portion comprising a lens, the lens receiving portion projecting outwardly from the bottom of the housing.

16. The logo lamp device of claim 15, wherein the condenser comprises one or more first protrusions which extend through openings in the PCB and are received by the cap, and one or more second protrusions which extend through openings in the mask and are received by the projector.

17. The logo lamp device of claim 16, wherein the housing comprises one or more indentations, grooves, protrusions or holes, and the projector comprises one or more protrusions which are received by the one or more indentations, grooves, protrusions or holes.

18. The logo lamp device of claim 1, wherein the at least one light source projects light in a direction which is substantially perpendicular to the optical assembly and all components of the optical assembly are arranged in a straight line without being angled with respect to one another.

19. The logo lamp of claim 1, wherein the at least one light source is positioned closer to the front than the back of the housing.

20. The logo lamp of claim 1, wherein the at least one optical element is two optical elements, one optical element being a condenser the other being a projector, and the optical assembly further comprises a mask interposed between the two optical elements, and wherein no other lenses are provided in the logo lamp.

21. The logo lamp of claim 1, further comprising an outer lens which is integrally molded with the housing as one integral unit, the housing comprising an exit pupil.

22. The logo lamp of claim 1, further comprising an outer lens which is attached to the housing by welding, gluing, or other attachment mechanisms, the housing comprising an exit pupil.

23. A side or rear view system for viewing a side or rear of a vehicle, the side or rear view system comprising:
   the logo lamp device comprising,
      a housing having a top, a bottom, a left side, a right side, a front, and a back,
      one or more clips formed integrally with or attached to the housing,
      a connector receiving portion comprising an opening formed at the back of the housing,
      a printed circuit board (PCB) enclosed within the housing,
      at least one light source connected to the PCB and enclosed within the housing, and
      an optical assembly comprising at least one optical element configured to receive light projected by the at least one light source; and
   a receiving frame comprising a receiving portion configured to attach to the bottom of the logo lamp device housing and one or more openings configured to receive the one or more clips of the logo lamp device.

24. The side or rear view system of claim 23, wherein the receiving frame further comprises an anti-backout blocker for preventing a connector from being removed from the connector receiving portion of the logo lamp device.

25. A motor vehicle comprising the side or rear view system of claim 23.

* * * * *